(12) United States Patent
Iyer

(10) Patent No.: US 10,075,412 B2
(45) Date of Patent: *Sep. 11, 2018

(54) CLIENT AWARE DHCP LEASE MANAGMENT

(71) Applicant: Aruba Networks, Inc., Sunnyvale, CA (US)

(72) Inventor: Pradeep Iyer, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,620

(22) Filed: Apr. 28, 2016

(65) Prior Publication Data

US 2016/0248730 A1 Aug. 25, 2016

Related U.S. Application Data

(63) Continuation of application No. 13/246,587, filed on Sep. 27, 2011, now Pat. No. 9,344,397.

(51) Int. Cl.
*H04L 29/08* (2006.01)
*H04L 29/12* (2006.01)

(52) U.S. Cl.
CPC ...... *H04L 61/2015* (2013.01); *H04L 61/2053* (2013.01); *H04L 61/2061* (2013.01); *H04L 67/24* (2013.01)

(58) Field of Classification Search
CPC ............. H04L 61/2015; H04L 61/2061; H04L 61/2076; H04L 29/12283; H04L 29/12301
See application file for complete search history.

(56) References Cited

U.S. PATENT DOCUMENTS 6,473,411 B1    10/2002    Kumaki et al.
6,578,074 B1 *   6/2003    Bahlmann ......... H04L 29/12009
                                                                                709/203

(Continued)

FOREIGN PATENT DOCUMENTS

WO    WO 2005/060208 A1    6/2005

OTHER PUBLICATIONS

Khadilkar, M., Feamester, M.S., Clark, R., Oct. 24-26, 2007. "Usage Based DHCP Lease Time Optimization" Retrieve on Aug. 6, 2016 from <http://conferences.sigcomm.org/imc/2007/papers/imc17.pdf>.*

(Continued)

*Primary Examiner* — Shean Tokuta
*Assistant Examiner* — Juan C Turriate Gastulo
(74) *Attorney, Agent, or Firm* — Brooks, Cameron & Huebsch, PLLC

(57) ABSTRACT

Managing DHCP address leases based on client properties. A DHCP server may allocate a short DHCP lease to a client device based on client properties. These client properties may include client device type, such as a type determined by OUI or OUI lookup, by client device characteristics, or by client position. Depending on client device properties, the client device is issued an address with a short lease time, or a long lease time. In the case of client activity, a DHCP server responds to initial requests for addresses by allocating an IP address with a short lease time. When the DHCP server receives a renewal request, it checks to see if the client has generated more than a predetermined amount of traffic. If the client has generated traffic exceeding this threshold level, the lease is renewed for a longer period. If the client traffic has not met the threshold level, the lease is renewed with the short lease time. Issuing addresses with short lease times removes inactive devices aggressively, returning addresses (Continued)

to the available lease pool. In an additional embodiment, a DHCP Relay mediates requests between clients and a DHCP server, rewriting lease times returned by the DHCP server to be short lease times. The DHCP Relay issues a DHCP Release to the DHCP server when a short lease to a client expires. The DHCP Relay mediates client DHCP Renew requests, renewing for a short lease time if the client has not generated traffic at the threshold level, and renewing for a long lease time if the client has generated traffic at or above the threshold level.

14 Claims, 2 Drawing Sheets

(56) References Cited

U.S. PATENT DOCUMENTS

| | | | |
|---|---|---|---|
| 7,054,944 B2 | 5/2006 | Tang et al. | |
| 7,114,070 B1 | 9/2006 | Willming et al. | |
| 8,054,804 B2 | 11/2011 | Small et al. | |
| 8,301,753 B1 | 10/2012 | Melvin | |
| 8,375,109 B1 | 2/2013 | Lange et al. | |
| 8,964,614 B1* | 2/2015 | Hassan | H04L 61/2015 370/311 |
| 2004/0064559 A1* | 4/2004 | Kupst | H04L 29/12216 709/226 |
| 2007/0147299 A1 | 6/2007 | Ando et al. | |
| 2007/0237148 A1 | 10/2007 | Jabr et al. | |
| 2007/0271371 A1* | 11/2007 | Singh Ahuja | H04L 43/18 709/224 |
| 2008/0008197 A1* | 1/2008 | Sakanashi | H04L 61/2015 370/401 |
| 2008/0065775 A1* | 3/2008 | Polk | H04L 61/2015 709/228 |
| 2008/0294780 A1* | 11/2008 | Lanahan | H04L 12/2463 709/226 |
| 2009/0232020 A1* | 9/2009 | Baalbergen | H04L 12/2809 370/254 |
| 2009/0307338 A1* | 12/2009 | Arberg | H04L 29/12273 709/221 |
| 2010/0191839 A1* | 7/2010 | Gandhewar | H04L 29/12028 709/220 |
| 2011/0023093 A1* | 1/2011 | Small | H04L 29/12283 726/4 |
| 2011/0137879 A1 | 6/2011 | Dubey et al. | |
| 2011/0243003 A1* | 10/2011 | Oguchi | H04W 76/028 370/252 |

OTHER PUBLICATIONS

Khadilkar, M., Feamester, M.S., Clark, R., Oct. 24-26, 2007. "Usage Based DHCP Lease Time Optimization" Retrieve on Aug. 6, 2016 from <http://conferences.sigcomm.org/imc/2007/papers/imc17.pdf.*
Microsoft Technet, "Determining Lease Duration:Dynamic Host Configuration Protocol", http://technet.microsoft.com/en-us/library/cc783573(v=ws.10).aspx, Mar. 28, 2003, 2 pages.
Droms, O., "Dynamic Host Configuration Protocol", Network Working Group, http://www.ietf.org/rfc/rfc2131.txt, Bucknell University, Mar. 1997, 32 pages.
Droms, Ed. R., et al., "Dynamic Host Configuration Protocol for IPv6 (DHCPv6)", Network Working Group, http://www.ietf.org/rfc/rfc3315.txt, Jul. 2003, 70 pages.
Troan, O. et al., "IPv6 Prefix Options for Dynarnic Host Configuration Protocol (DHCP) version 6", Network Working Group, http://www.ietf.org/rfc/rfc3633.txt, Dec. 2003, 14 pgs.
Droms, R., "Stateless Dynamic Host Configuration Protocol (DHCP) Service for IPv6", Network Working Group, http://tools.ietf.org/html/rfc3736, Cisco Systems,Apr. 2004, 7 pgs.

* cited by examiner

CLIENT AWARE DHCP LEASE MANAGMENT

PRIORITY INFORMATION

This application is a continuation of U.S. application Ser. No. 13/246,587 filed Sep. 27, 2011, the contents of which are incorporated herein by reference.

BACKGROUND OF THE INVENTION

The present invention relates to wireless digital networks, and more particularly, to the problem of managing addresses assigned to clients through DHCP.

Data networks, particularly wireless data networks, have become an expected or necessary resource in more and more situations. Once present only in the workplace environment, they are now nearly ubiquitous, present in schools, libraries, retail environments, and just about anyplace where people gather.

Operating wireless networks, particularly in environments handling large numbers of users and/or devices present a number of challenges. The operating environment has changed dramatically within the last few years, from a user having a single device such as a laptop computer with wireless capability, to a single user having multiple devices each with such capability, such as laptops, smart phones, tablets, and portable music players.

To work with a local wireless network, a device first uses the DHCP protocol to request an address which the device will use while associated to the network. This address is supplied by a DHCP server. The number of distinct addresses available to the DHCP server is determined by its configuration and is finite. A DHCP server is considered to own the IP addresses it manages, and leases them to clients. A DHCP server responds to requests by returning an address (if one is available) which is valid for a predetermined period of time, known as the DHCP lease time. DROP servers may also work through DHCP relays, which are used to administer subnets.

DHCP is known to the art, described for example in RFC 2131 for IPv4 networks, and described in RFC 3315, RFC 3633 and RFC 3736 for DHCPv6 in IPv6 networks.

Particularly in IPv4 environments where multiple users with multiple devices congregate, the finite number of distinct addresses available through a DHCP server may turn out to be a limiting factor in supporting users on the network.

It has also become apparent in monitoring such networks that while there may be a large number of devices associated to a network, only a fraction of those devices are active. Yet each associated device is tying up an address.

It is known to the art that in environments where the number of users may exceed the number of addresses available, short lease times should be used to free up unused addresses and make them available.

The seemingly simple and straightforward solution of having the DHCP server only grant short leases, two minutes, for example, does not work. To be motivated to attempt such a solution, one has to have a network environment in which users exceed available addresses; a very busy environment. In such an environment, issuing only short leases will result in an overloaded DROP server and network segments flooded with DHP traffic.

What is needed is a better way to manage DHCP leases.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of managing DHCP leases based on client properties. Short or long lease times are assigned to clients based on properties such as device type, OUI, client location, or client activity.

In one embodiment, device type may be identified from the device OUI or derived from device OUI, Based on device type, highly mobile devices such as smart phones and tablets may be assigned short lease times.

In one embodiment, short lease times may be assigned to devices based on client location, such as through one or more access points covering a particular area.

In one embodiment lease times are based on client activity. A DHCP server allocates addresses with an initial short lease time, as an example, a few minutes. When a DHCP Renew request is received, the DHCP server queries client network activity. If client activity is above a predetermined level, the DHCP server renews the lease with a longer interval, for example, an hour. If the client activity is below the predetermined level, another short lease time is given.

In one embodiment, a DHCP Relay mediates between the client and DROP server. The DHCP Relay monitors the offer—ack process by returning a short lease to the client. If this short lease expires, or the client device disconnects, the DHCP relay issues a release to the DHCP server. The DHCP Relay handles client DHCP Renew requests, renewing for a short lease if the client activity is below the predetermined level, otherwise renewing for a long lease time.

Figure 1:
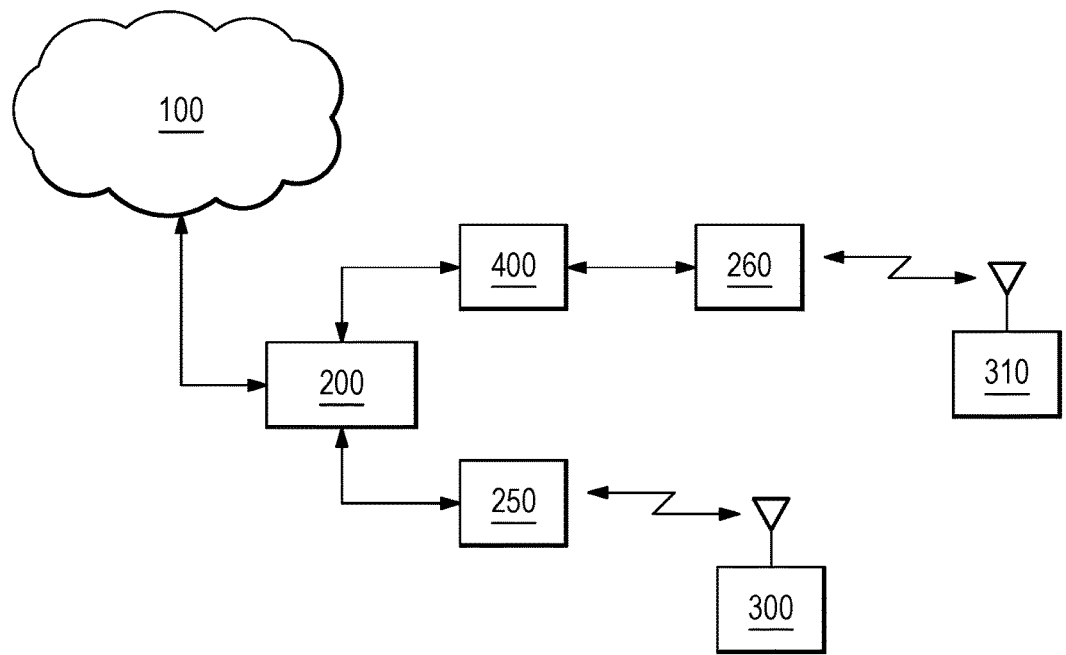
FIG. 1 shows devices in a network.

According to the present invention and as shown in FIG. 1, a client device 300 wishing to communicate with network 100 first acquires an address by communicating with DHCP server 200.

As shown in FIG. 1, wireless client devices 300 and 310 wish to communicate with other devices on network 100. Client devices 300 and 310 are served by wireless access points 250 and 260. Wireless access point 250 is in direct communication with DHCP Server 200, while wireless access point 260 goes through DHCP Relay 400.

As is understood in the art, wireless access points 250 and 260 are purpose-built digital devices, each containing a processor, a memory hierarchy, and input/output interfaces. Such devices typically operate under the control of an operating system such as Linux, running specific programs to provide for access point operation. A MIPS-class processor such as one from Cavium or NetLogic—RMI may be used. Wired network interfaces typically are IEEE 802.3 Ethernet interfaces. Wireless interfaces are typically IEEE 802.11 WiFi interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

DHCP server 200 and DHCP relay 400 may be hosted on distinct hardware platforms, each containing one or more processors, a memory hierarchy, and input/output interfaces, or the DHCP server and DHCP relay functionality may be hosted on another network device, such as a router, switch, controller, or access point.

Client devices 300 and 310 are also digital devices containing a processor, memory hierarchy, and input/output interfaces, including a wireless interface such as an IEEE 802.11 wireless interface for communicating with wireless access points 250 and 260, Typical wireless client devices 300, 310 include but are not limited to laptop and netbook computers, wireless phones, wireless music players, and other wireless devices such as barcode scanners, instruments, and the like.

For clarity, FIG. 1 does not show other typical network devices such as switches, routers, firewalls, and the like which are well understood by the art.

Figure 2:
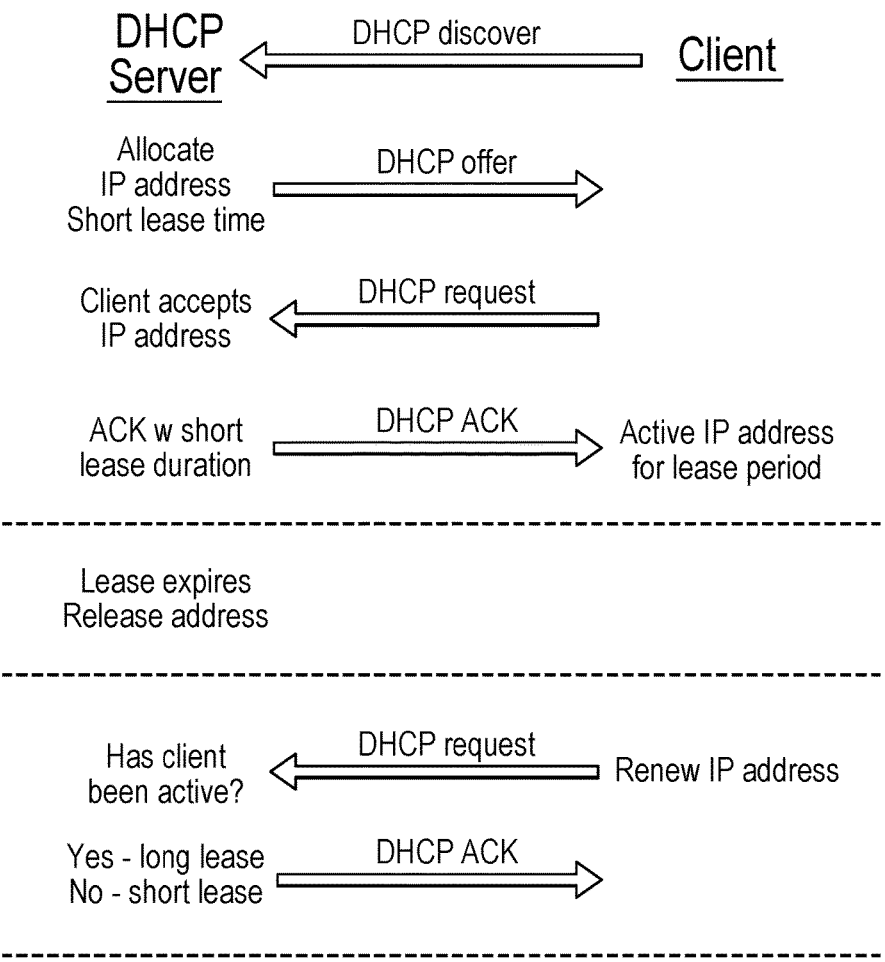
FIG. 2 illustrates an aspect of the invention.

According to the present invention, and as shown in FIG. 2, for a client device 300 to operate on a digital network, it must first acquire an address, which it does using the DHCP protocols. These protocols are used in both wired (such as IEEE 802.3) and wireless (such as IEEE 802.11) networks.

DHCP is known to the art, described for example in RFC 2131 for IPv4 networks, and described in RFC 3315, RFC 3633 and RFC 3736 for DHCPv6 in IPv6 networks. While the examples herein given are with respect to IPv4 networks, they are equally applicable to IPv6 networks.

Client device 300 begins the process by sending out a DHCP discover request. This request contains the client's unique MAC address. As is known in the art, the first three octets of the MAC address are the OUI as assigned by the IEEE Registration Authority and identify the manufacturer of the device.

In one embodiment of the invention, lease time is based on client device type. DHCP server 200 receives the client request, whether direct from the client or through a DHCP relay, and allocates an IP address with a lease time based on client device type. Device type may be based on the device OUI, derived from the device OUI, or may be derived from previous operating characteristics of the device recorded by MAC address. Tables mapping ails or MAC addresses to device types may be kept in the DHCP server, or elsewhere on the network for lookup use. As an example, highly mobile devices such as smart phones and tablets may be given short lease times, while less mobile devices, such as workstations or printers may be given longer lease times.

In one embodiment of the invention, address lease time may be based on client location. As an example, an educational institution may wish to have a 1 hour lease time in lecture hall and lab locations, longer lease times in faculty/ staff areas, and short lease times in high-mobility locations such as cafeterias and commons areas.

In one embodiment of the invention, address lease time may be based on time of day or other calendar/time basis. As an example, a college library may wish to use short lease times during peak usage periods, but fall back to longer lease times in periods of lower use, such as Friday and Saturday nights.

In one embodiment of the invention address lease time is based on client activity. Assume client 300 is in direct communication with DHCP Server 200. Client 300 sends out a DHCP discover request. DHCP server 200 responds with a DHCP Offer, allocating an IP address to the client and according to the invention, assigning a short lease time to the offer.

Client 300 accepts the offer by responding with a DHCP Request, accepting the IP address for the short duration specified in the DHCP Lease.

DHCP Server 200 responds with a DHCP ACK, and the IP address assigned to the client device MAC for the short lease duration.

According to the invention, using an initial short lease quickly ages out inactive devices. After the short initial DROP lease period, if client 300 has gone inactive, the lease expires and DHCP Server 200 returns the address to the DHCP pool, where it may be reused by a different client device seeking an address.

Prior to the expiration of the short DHCP lease period, a client 300 may renew the DROP lease through a DROP Request.

According to the present invention, DROP server 200 tests to see if client 300 has been active on the network. This may be accomplished, for example, by querying a controller or access point through which client 300's traffic flows. Traffic may be measured for example in terms of sessions, packets, bytes, or other measures of network use by the client. For example in the case of the wireless network shown in FIG. 1, client 300 connects to the network through wireless access point 250 All data to and from client 300 flows through AP 250. The AP may, for example, track sessions initiated by client 300, or may track, data to and from the device.

According to the invention, if client 300 has been active, a DHCP ACK is returned renewing the lease for a long period. If client 300 has not been active, a DHCP ACK is returned renewing the lease for another short period. Renewing the lease for a short period on devices which have not met an activity threshold continues the goal of aging out inactive devices through the use of short lease times.

In an additional embodiment of the invention where lease time is based on client activity, a DHCP Relay 400 is between client 310 and DHCP server 200. DHCP Relays are known to the art, and are used when a single DHCP server is used to provide IP addresses over multiple subnets. In such instances, DROP Relays are used in each subnet to provide DHCP services to clients which do not have direct access to a DHCP server. In operation a client on a local subnet broadcasts a DHCP request, which is received by the DROP Relay. The DROP Relay then unicasts the DROP request, to the DROP Server, which unicasts a response to the DHCP Relay. The DROP Relay then retransmits the response on the local subnet.

Performing the steps of the present invention in a DHCP Relay allows the invention to be performed in a system using an older, legacy DHCP server, without needing to alter or replace that DHCP server.

DHCP Relay 400 may then take generic leases returned by DHCP server 200 and return lease times to clients based on client properties. As described above, these properties may include device type, OUI, client location, and/or client activity.

DHCP Relay 400 also issues DHCP Releases to DHCP server 200 when a short lease to a client expires, or the client disconnects from the network without issuing a DHCP Release.

According to an embodiment of the invention, when client 310 issues a DHCP discover, this request is received by DHCP Relay 400 and unicast to DHCP Server 200. DHCP Server 200 unicasts a DHCP Offer to DHCP Relay 400, allocating an address in the local subnet for client 310. DHCP Relay 400 rewrites the lease time in this DROP Offer to a short lease time and retransmits the DROP Offer on the local subnet to client 310. DHCP Relay 400 mediates the DHCP Request response from client 310, forwarding it to DHCP Server 200, which responds with a DHCP ACK, which DHCP Relay 400 sends to client 310.

According to the present invention, even if, for example, DHCP Server 200 issues uniform 8 hour DHCP leases, DHCP Relay 400 rewrites these to short DHCP Leases. If the short DHCP lease to client 310 expires, DHCP Relay 400 issues a corresponding DHCP Release to DROP Server 200 to return that address to the available IP pool for the subnet supported by DHCP Relay 400. DHCP Relay 400 will also initiate a DROP Release to DHCP Server 200 on behalf of client 310 if client 310 disconnects without initiating a DHCP Release. This reinsures that context is cleared for short-lived clients, and their IP addresses are returned to the available pool.

DHCP Relay 400 mediates DHCP Renew requests from client 310. As previously described, in one embodiment of the invention, if client 310 has been active, a DHCP ACK is returned by DHCP Relay 400 renewing the lease for a long period. If client 310 has not been active, a DHCP ACK is returned by DHCP Relay 400 renewing the lease for another short period. Renewing the lease for a short period on devices which have not met an activity threshold continues the goal of aging out inactive devices through the use of short lease times.

It should be understood that the steps and processes of the present invention are performed by a DROP Server and/or DHCP Relay being hosted on a suitable device on the network such as a controller, a dedicated host, or an access point. Similarly, the client device may be a laptop or desktop computer, tablet, handheld device, or fixed-function device capable of performing the methods described herein.

The present invention may be realized in hardware, software, or a combination of hardware and software. A typical combination of hardware and software may be a network server or access point with a computer program that, when being loaded and executed, controls aspects of the host device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following; a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A non-transitory computer readable medium storing instructions executable by a processing resource to cause a computing device to:
   determine properties of a client device based on a dynamic host configuration protocol (DHCP) discover request received from the client device, wherein the properties of the client device include a day of a week of the client device;
   assign a first lease time of an Internet Protocol (IP) address to the client device based on the day of the week of the client device, wherein each day of the week corresponds to a different first lease time of the IP address;
   query a network device to determine an activity level of the client device measured by a number of packets transmitted to and from the client device during the first lease time;
   determine, whether the client device has been active during the first lease time based on whether the determined activity level of the client device exceeds an activity level threshold;
   assign a second lease time of the IP address to the client device that is longer than the first lease time in response to the client device having been active during the first lease time in response to the activity level exceeding the activity level threshold; and
   assign a third lease time of the IP address to the client device that is the same length as the first lease time in response to the client device having been inactive during the first lease time in response to the activity level not exceeding the activity level threshold.

2. The medium of claim 1, wherein the instructions to assign the first lease time are based on a time of the day.

3. The medium of claim 1, wherein:
   the instructions to determine the properties of the client device include instructions to determine an activity of the client device; and
   the instructions to assign the first lease time are based on the client device activity.

4. The medium of claim 1, wherein:
   the instructions to determine the properties of the client device include instructions to determine a location for the client device; and
   the instructions to assign the first lease time are based on the client device location.

5. The medium of claim 1, comprising instructions to:
   determine that the client device has disconnected from a network without sending a DHCP Release message to the computing device; and
   returning the IP address corresponding to the client device to an available pool of IP addresses in response to the client device disconnecting from the network.

6. A method, comprising:
   determining properties of a client device based on a dynamic host configuration protocol (DHCP) discover request received from the client device, wherein the properties of the client device include a day of a week of the client device;
   assigning a first lease time of an Internet Protocol (IP) address to the client device based on the day of the week of the client device, wherein each day of the week corresponds to a different first lease time of the IP address;
   query a network device to determine an activity level of the client device measured by a number of packets transmitted to and from the client device during the first lease time;
   determining whether the client device has been active during the first lease time based on the whether the determined activity level of the client device exceeds an activity level threshold; and
   assigning a second lease time of the IP address to the client device, wherein the second lease time is longer than the first lease time in response to the client device having been active during the first lease time in response to the activity level exceeding the activity level threshold; and
   assigning a third lease time of the IP address to the client device, wherein the third lease time is the same length as the first lease time in response to the client device having been inactive during the first lease time in response to the activity level not exceeding the activity level threshold.

7. The method of claim 6, wherein the method includes:
monitoring communication activity by the client device assigned to the IP address;
determining that no communication activity has occurred by the client device for a threshold duration of time; and
releasing the IP address assigned to the client device in response to the client device not communicating for the threshold duration of time.

8. The method of claim 7, wherein the IP address is released to a pool of IP addresses available to be assigned to the client device.

9. The method of claim 6, wherein the determined properties of the client device include at least one of:
the client device type;
a client device activity;
a client device location; and
a time and a date.

10. A system, comprising:
a client device; and
a dynamic host configuration protocol (DHCP) server including memory and a processor coupled to the memory and configured to execute instructions stored in the memory to:
determine a day of a week of the client device based on a DHCP discover request received from the client device;
assign a first lease time of an Internet Protocol (IP) address to the client device based on the day of the week of the client device, wherein each day of the week corresponds to a different first lease time of the IP address;
query a network device to determine an activity level of the client device measured by a number of packets transmitted to and from the client device during the first lease time;
determine whether the client device has been active during the first lease time based on whether the determined activity level of the client device exceeds an activity level threshold;
assign a second lease time of the IP address to the client device that is longer than the first lease time in response to the client device having been active during the first lease time in response to the activity level exceeding the activity level threshold; and
assign a third lease time of the IP address to the client device that is the same length as the first lease time in response to the client device having been inactive during the first lease time by sending a DHCP renew response to the client device in response to the activity level not exceeding the activity level threshold.

11. The system of claim 10, wherein the device type is determined from a device Organizationally Unique Identifier (OUI) included in the DHCP discover request.

12. The system of claim 10, wherein the device type is determined from a mapping of a device Organizationally Unique Identifier (OUI) included in the DHCP discover request.

13. The medium of claim 1, wherein the properties of the client device include a client device type.

14. The medium of claim 1, wherein the properties of the client device include a mobility of a client device type.

* * * * *